United States Patent [19]

Meyer et al.

[11] 4,330,566

[45] May 18, 1982

[54] POURABLE, CRUNCHY BATTER FOR FOOD PRODUCTS

[75] Inventors: Richard Meyer, Phoenix, Ariz.; Sam H. Lee, San Jose, Calif.

[73] Assignee: Amour-Dial, Inc., Phoenix, Ariz.

[21] Appl. No.: 214,077

[22] Filed: Dec. 8, 1980

Related U.S. Application Data

[63] Continuation-in-part of Ser. No. 52,529, Jun. 27, 1979, abandoned.

[51] Int. Cl.³ .............................................. A23D 5/00
[52] U.S. Cl. ................................... 426/606; 426/293; 426/553
[58] Field of Search ............... 426/555, 293, 296, 601, 426/606, 652, 553

[56] References Cited

U.S. PATENT DOCUMENTS

| | | | |
|---|---|---|---|
| 3,369,909 | 2/1968 | Schroeder et al. | 426/417 |
| 3,586,512 | 6/1922 | Mancuso | 426/250 |
| 3,843,827 | 10/1974 | Lee | 426/296 |
| 3,852,501 | 12/1974 | Fazzina | 426/293 |
| 3,973,053 | 8/1976 | Galusky et al. | 426/601 |
| 4,068,009 | 1/1978 | Rispoli et al. | 426/296 |

*Primary Examiner*—Raymond N. Jones
*Assistant Examiner*—Elizabeth A. Hatcher
*Attorney, Agent, or Firm*—Frank T. Barber; Richard G. Harrer

[57] ABSTRACT

An edible food coating in the form of a batter which is applied to an item of food such as chicken and the like. The batter coating includes a fluid shortening which contains a solid triglyceride largely in the beta crystal form, a food grade binder and breading materials. The coated food product, when baked, has the attributes of a batter-coated, deep fat fried, or pan fried food product.

7 Claims, No Drawings

POURABLE, CRUNCHY BATTER FOR FOOD PRODUCTS

This is a continuation in part of Application Ser. No. 52,529 filed June 27, 1979, now abandoned.

BACKGROUND OF THE INVENTION

1. Field of the Invention

This invention relates to an edible batter coating for foods which is applied to the food prior to cooking, readily adheres to the food, and which enhances the appearance and taste of the ultimate cooked product.

2. Description of the Prior Art

It is of course well known to provide various foods with some type of edible coating prior to frying or baking. For years breaded pork chops have been prepared by seasoning the uncooked chop with salt and pepper and then dipping it into a fluid such as milk or a well-beaten egg, applying bread crumbs, followed by pan frying in a shortening. We are also familiar with the dipping of an uncooked food piece into a highly viscous batter followed by deep fat frying of the batter-coated food item. In short, the art is replete with many techniques and coatings for food products which serve to enhance the appearance and taste of the product when fried or baked.

Edible food coatings are also available which, when applied to food such as a chicken part or pork chop, and subsequently baked, are said to give the appearance of the coated product having been fried. Mancuso et al U.S. Pat. No. 3,586,512 discloses such an edible coating in a powdered form. After the food has been coated with the powder, it is baked at an appropriate temperature and time, and the resultant cooked product is said to exhibit the appearance of a fried food. The Mancuso et al product utilizes powdered fat, a farinaceous material such as wheat flour, a binder such as starch, CMC, soy protein and a dye.

U.S. Pat. Nos. 3,843,827 to Lee et al and 4,068,009 to Rispoli, disclose other products and techniques to achieve a baked food product with the texture and appearance of a fried product. The patents disclose a batter and dry mix coating.

Although all of the foregoing are seemingly effective in providing baked food products which have the appearance of being fried, each of the Lee et al and Rispoli et al products have the drawback in that the consumer must go through two separate operations; i.e., first, coating the food with a batter followed by a second step of providing the batter-coated product with a dry mix coating. The Mancuso et al product of course requires a dye and also the coating technique requires that the consumer coat the food product within a bag or other type of container.

With the foregoing in mind, there exists a need for an edible coating for foods which can be easily applied to the food by the consumer and the thusly coated food when baked has all the attributes of a batter-coated, deep fat fried, crispy food product. It is preferable that such a product be shelf stable for an extended period of time, should readily adhere to the food item being coated, and, if possible, be designed so that it does not require preservatives or special processing to achieve shelf stability.

SUMMARY OF THE INVENTION

It is an object of this invention to provide an edible food coating composition which when applied to a food which is subsequently baked, yields a cooked food product having all the attributes of a food which has been coated with a batter and breading and subsequently either deep fat fried or pan fried.

It is a further object of this invention to provide an edible food coating composition in the form of a batter containing a breading ingredient and which is shelf stable without the need for preservatives or special processing.

It is still another object of the invention to provide an edible food coating compression in which a breading ingredient is suspended throughout the batter to aid in providing crunchiness to the cooked food.

It is another object of the invention to provide an edible food coating composition in a ready-to-use form or, in the alternative, a more concentrated form which requires some further preparation on the part of the user.

Briefly the objects of this invention are accomplished by mixing together a combination of a particular type of fluid shortening, a food grade binder or adhesive, a suitable breading material, and optional flavorings and colors.

The breading materials are substantially distributed throughout the coating composition and this is accomplished without the need to incorporate emulsifiers. In short, although the coating composition is in a pourable or semi-pourable state, the breading material remains evenly distributed throughout and the product does not require shaking or mixing, except in the concentrated version, by the consumer prior to use. In addition, as mentioned heretofore, the product is shelf stable without the use of any heat treatment in the preparation of the coating composition or through the use of preservatives.

The fluid shortening is a principal and critical constituent of our coating composition, since it performs not only its usual function of shortening or tenderizing food, but also serves to uniformly suspend the breading material, food grade adhesives and any of the optional ingredients such as flavorings throughout the coating composition. By the term fluid shortening as used herein and the appended claims, we mean a shortening which is a viscous fluid in the temperature range of 70° F. to 100° F. and which is normally prepared from a liquid oil such as cotton seed or soy bean oil. It is important that the shortening contained from about 10 to 35% by weight of solid triglyceride, largely in the beta crystal form. The solids content is measured at 92° F. by the "Dilatometric Method"—A.O.C.S. #Cd 10-57 (American Oil Chemistry Society standard method). We prefer shortenings having from 20%–30% of such solid triglyceride. If the percentage of beta crystals is less than about 10%, the fluid shortening will not adequately suspend the other materials present in our coating composition over an extended period of time. Thus the viscosity of the liquid shortening should range between 1000 and 50,000 cP or about 0.2–17 Bostwick units and such viscosity is primarily dependent on the amount of beta crystals present in the fluid shortening. The total amount of fluid shortening present in our edible coating composition ranges from about 20 to 60% by weight, preferably about 45 to 55% in the ready-to-use form and about 26 to 31% in the more concentrated composition.

The food grade binder or adhesive present in the coating composition enhances the ability of the coating to stick to a food product. We can use such materials as starch, sodium caseinate or spray dried egg white, although we prefer to use a starch which has been modified by the addition of sodium hypochlorite to the aqueous starch slurry—so-called oxidized starch. The amount of adhesive present in the ready-to-use composition should range between about 7 and 21%, preferably about 11% ot 17%. In the concentrated form the amount ranges from about 7 to 30%, preferably about 8 to 28%. Although it is possible to use more than the amounts set forth above, adding more than these amounts tends to produce a gritty mouth feel in the food product after cooking. Also, a starch taste results, which could be objectionable to consumers.

The breading materials also form an important aspect of this invention in that they not only provide a "crunchiness" to the food product when baked, they also seem to contribute to the stability of the edible coating composition. By the term "breading materials" we include all of the customary farinaceous materials such as bread crumbs, corn crumbs, cereals, puffed carbohydrates, flours prepared from wheat, corn or oats or mixtures of these grains. Although the particular type of breading material used is not critical, the size of it is important. The breading materials used should fall within a U.S. Standard sieve size of about 3–12, preferably about 7–10. Breading materials smaller than a sieve size 12 are undesirable since they tend to make the final cooked product gritty rather than crunchy; correspondingly, breading materials larger than sieve size 3 detract from the appearance of the final product. The amount of such breading may range from about 10 to 35%.

In preparing a coating product using the aforementioned ingredients we have noticed that on occasion a small layer of liquid oil may appear on the uppermost surface of the product—in short, a slight phase separation. Although this oil layer does not affect the performance of a product, it may detract somewhat from its appearance. Various gums such as guar gum and xanthan were incorporated into the product but without success. However, we have discovered that the addition of so-called bulking agents does serve to prevent this oil separation. These bulking agents can be described as sponge-like in nature, usually in powder form, and include such agents as silicon dioxide, tomato powder, corn syrup powder as well as a combination of microcrystalline cellulose and water. About 0.10 to 20% by weight of such bulking agent may be added to the ultimate product although about 5% is usually sufficient to prevent oil separation.

Moreover, we have found that it is also possible to reduce the likelihood of free oil being present in the coating composition by using a fluid shortening prepared in accordance with certain teachings in Schroeder et al U.S. Pat. No. 3,369,909—"Method for Making Fluid Oleaginous Suspension". A liquid oil such as cotton seed or soybean oil is adjusted to about 13% solids by the addition of tristearin hard fat along with about ½% of a high melting point (about 145° F.) monoglyceride such as a product called "Myvatex 8-20E" manufactured by Eastman Chemical Products, Inc. The oil containing the tristearin and monoglyceride is completely melted and thereafter cooled under conditions of mild agitation whereupon crystallization of the hard fat to the beta phase is initiated. The resulting fluid shortening is creamy white in color and of a rather thin consistency. Even though the solid triglyceride content is lower than that preferred in other fluid shortenings usable in our coating composition, the shortening very adequately functions to uniformly suspend the breading material, adhesives and other optional ingredients throughout the coating composition.

The batter coating also includes suitable flavorings and colorings through the use of onion powder, garlic powder, pepper, salt, paprika and the like and food-grade colors certified by the Food & Drug Administration for food, drug and cosmetic use.

The batter coating of this invention is easily prepared by slowly adding the adhesive to the fluid shortening using low-speed mixing. Mixing is continued until lumps are no longer visible. Thereafter any other liquid ingredient—color(s), flavorings, are thoroughly mixed in. This is followed by the addition of any remaining dry ingredients other than the breading materials. Finally, the breading materials are added with mixing until no visible lumps are present. Thereafter, the product is packaged in suitable containers.

As previously mentioned, our coating product has low "water activity". The term water activity represents a measure of unbound free water in a food product that is available to a microorganism for use in its metabolic growth processes. Water activity ($a_w$) values are dimensionless and are expressed as fractions relative to the water activity of pure water which is taken as 1.0. This scheme for stating water activity has been accepted in the food art and is described in greater detail in the publication titled "Commercial Development of Intermediate Moisture Foods" in *Food Technology*, Vol. 24, p. 889 (August 1970).

Spores of Bacillus and Clostridium will not develop into vegetated cells at an $a_w$ value of less than 0.92, and the product of this invention easily achieves an $a_w$ value of less than 0.92. In fact, as will be demonstrated in the following examples, the product of this invention has a very low water activity, in the order of 0.20 to 0.70. The most preferred water activity level is in the range of 0.60–0.65 for the ready-to-use product and about 0.20 to 0.35 in the concentrated product.

In summary then, the present invention provides an edible food coating which gives particularly desirable results when applied to foods that are to be baked. The product is easily applied to the food by the consumer and after the coated food is baked, it has all the attributes of a batter-coated, deep fat fried, crispy food product. The product is unique in that it is shelf stable for extended periods without the overt addition of preservatives or special heat treatment, and it contains a suspended breading material. In short, when the consumer opens the container to use the coating, the ready-to-use product does not require stirring or other preparation before use.

The following examples are illustrative but are not to be construed as limiting as to the preparation and use of batter coating composition of this invention. The percentages expressed heretofore and in the following examples are on a weight basis unless otherwise indicated.

EXAMPLE I

A number of fluid shortenings were tested in coating compositions to determine the effect of the amount of beta crystals present in the shortening on the stability and appearance of the final product. The formula used for the coating was that of Example II.

| Oil Sample | Beta-Crystal Content | Stability | Comments |
|---|---|---|---|
| J-1981 | 29–30% | Excellent | Product has soft plastic texture. |
| J-2681 | 24% | Very good | Product has soft plastic texture. |
| L-1481 | 23% | Fair | Slight amount (⅛") of free oil. |
| J-0681 | 23% | Fair | Slight amount (⅛") of free oil on top or bottom of final product. |
| J-1381 | 23% | Good | Same product during tests showed slight amount of free oil. |
| J-2481 + Emulsifier | 23% | Good | Stable product. Emulsifier was a high melting point monoglyceride. |

A series of ready-to-use batter coatings were prepared having the following formulas:

EXAMPLE II

| Ingredient | % by Weight |
|---|---|
| Fluid shortening (30% beta crystals) | 54.581 |
| Antioxidant | .046 |
| Citric acid | .023 |
| Water | 5.690 |
| Microcrystalline cellulose | .800 |
| Oxidized starch | 14.790 |
| Spices | 5.870 |
| Corn flake crumbs* | 18.200 |

*70% of flakes passed through a #7 sieve and retained on a #20 sieve; no more than 30% fines.

The foregoing product was formulated to have a so-called Southern fried chicken flavor.

It should be noted that in this Example II some water and microcrystalline cellulose was incorporated to prevent any oil separation which might occur upon prolonged standing or under extreme conditions.

EXAMPLE III

| Ingredient | % by Weight |
|---|---|
| Fluid shortening (17% beta crystals) | 47.476 |
| Antioxidant | .039 |
| Oxidized starch | 11.290 |
| Spices | 2.380 |
| Certified colors | .140 |
| Citric/malic acid | .285 |
| Brownulated sugar | 9.860 |
| Corn syrup powder/Tomato powder | 14.120 |
| Corn flake crumbs | 14.410 |

In preparing the composition of this Example III, which is formulated to have a barbeque flavor, the shortening and starch were blended together in a ribbon mixer until smooth. Thereafter the spices and colors were added and mixed until evenly colored. This was followed by the mixing in of the remaining ingredients, one at a time, with the corn flake crumbs being the last ingredient added to the composition.

EXAMPLE IV

| Ingredient | % by Weight |
|---|---|
| Fluid shortening (17% beta crystals) | 45.692 |
| Antioxidant | .038 |
| Emulsifier | 1.040 |
| Oxidized starch | 16.590 |
| Corn flake crumbs 70%-7/20 sieve | 16.720 |
| Corn sweetener | 8.250 |
| Honey | 5.220 |
| Honey flavoring | .100 |
| Butter flavoring | .060 |
| Brownulated sugar | 3.870 |
| Other spices/flavorings | 1.420 |

The product of Example IV was formulated to have a honey flavor. The product was prepared by combining about 15% of the total amount of fluid shortening used in preparing the product with the antioxidant and emulsifier in a steam jacketed mixing kettle. The ingredients were constantly stirred at a temperature of 120° F. The balance of the shortening, corn sweetener, honey, artificial honey flavoring, butter flavoring were well blended together in a separate, large mixer. The previously prepared shortening/antioxidant/emulsifier mixture was then added and all ingredients were well blended. This mixture was then homogenized at 1000 psi and transferred to a ribbon blender. Thereafter the starch was added to the mixture and mixed until smooth. The remaining ingredients, with the exception of the corn flakes, were added and thoroughly blended. Finally the corn flakes were added and the total mixture was mixed until the corn flakes were evenly dispersed throughout.

EXAMPLE V

| Ingredient | % by Weight |
|---|---|
| Fluid shortening (23% beta crystals) | 47.485 |
| Oxidized starch | 16.872 |
| Corn flake crumbs | 15.304 |
| Emulsifier | 1.058 |
| Antioxidant | .039 |
| Corn syrup | 8.390 |
| Honey | 5.309 |
| Brown sugar | 3.936 |
| Salt | 1.271 |
| Pepper | 0.051 |
| Flavor enhancer | 0.102 |

This product of Example V was to have a honey flavor.

EXAMPLE VI

| Ingredient | % by Weight |
|---|---|
| Fluid shortening (30% beta crystals) | 47.476 |
| Oxidized starch | 11.290 |
| Corn flake crumbs | 14.410 |
| Brown sugar | 9.860 |
| Corn syrup powder | 7.390 |
| Tomato powder | 6.730 |
| Flavorings and seasonings | 2.844 |

The product of Example VI was formulated to have barbecue flavor.

EXAMPLE VI-A

| Ingredient | % by Weight |
|---|---|
| Fluid shortening (13% beta crystals) | 48.000 |
| Oxidized starch | 20.750 |
| Spice blend | 4.800 |

| Ingredient | % by Weight |
| --- | --- |
| Black pepper | .233 |
| Ground cumin | .124 |
| Onion powder | .110 |
| Garlic powder | .110 |
| White pepper | .103 |
| Citric acid | .220 |
| Corn flake crumbs | 25.750 |

The product of Example VI-A utilized a fluid shortening made in accordance with the teachings of U.S. Pat. No. 3,369,909. The product had good pourability, good adhesion to raw chicken parts, and the final cooked food had a very crisp coating.

The edible coating compositions described in the previous examples are in a ready-to-use form. That is, the user applies the coating composition directly to the food item without any further preparation being necessary. However, it is possible to prepare a more concentrated product which requires some further preparation on the part of the user. Such a product will contain less of the fluid shortening but an increased amount of the breading, starch and seasonings. Such a concentrated product does require that the user add some liquid oil to the concentrated coating prior to applying the coating to a food item. Whereas the ready-to-use product contained from about 40-60% by weight of the fluid shortening, about 7-21% by weight of starch and about 10 to 20% by weight of breading, the concentrated version may contain from about 20 to 40% by weight of shortening, about 18 to 35% by weight of breading and 8 to 28% by weight of the starch. Such concentrated products have all the attributes of the ready-to-use products, that is, stability, low water activity, adhesion to the food item. The type of oil that the user mixes into the concentrated product is not critical. Any food grade liquid cooking oil may be used since its primary function is to reduce the viscosity of the concentrated product so that it may be more easily applied to the food item.

Concentrated batter coatings were prepared having the following formulas:

EXAMPLE VII

| Ingredient | % by Weight |
| --- | --- |
| Fluid shortening (23% beta crystals) | 27.843 |
| Oxidized starch | 24.000 |
| Corn flake crumbs | 24.180 |
| Dried honey | 7.550 |
| Sugar, granulated | 5.040 |
| Molasses | .560 |
| Fructose | 5.050 |
| Glucose | 3.760 |
| Salt | 1.200 |
| Other seasonings, flavorings | .817 |

The product of Example VII was formulated to have a honey flavor and was prepared by pre-blending all the dry ingredients except the corn flake crumbs. The shortening was then thoroughly blended into the mixture using a ribbon blender. Finally, the corn flake crumbs were added.

EXAMPLE VIII

| Ingredient | % by Weight |
| --- | --- |
| Fluid stortening (23% beta crystals) | 30.47 |
| Antioxidant | 0.31 |
| Oxidized starch | 18.26 |
| Corn crumbs | 23.31 |
| Sugar, granulated | 9.31 |
| Molasses | 1.04 |
| Corn syrup solids | 7.76 |
| Tomato powder | 6.73 |
| Other flavorings and colors | 2.81 |

This product (Example VIII) was formulated to have a so-called barbecue flavor.

EXAMPLE IX

| Ingredient | % by Weight |
| --- | --- |
| Fluid shortening (23% beta crystals) | 39.84 |
| Oxidized starch | 23.99 |
| Corn flakes | 29.51 |
| Spices | 6.66 |

This product (Example IX) was formulated to have a so-called Southern fried chicken flavor.

EXAMPLE X

| Ingredient | % by Weight |
| --- | --- |
| Fluid shortening (23%) beta crystals | 30.28 |
| Oxidized starch | 18.26 |
| Color | .14 |
| Citric/malic acid | .29 |
| Sugar | 10.35 |
| Corn syrup solids | 7.76 |
| Tomato powder | 6.73 |
| Corn crumbs | 23.31 |
| Hickory charoil | .50 |
| Spices | 2.38 |

The product of Example X was formulated to have a so-called smoky barbecue flavor.

The foregoing products can be packaged in 10.5 ounce containers with instructions for the user to add ¼ cup (2 ounces) of liquid cooking oil to the concentrated product. The final product is sufficient to coat about 2½ pounds of raw chicken. The coated chicken is then baked at 375° F. for 50 minutes.

Having described our invention, what is claimed as new and desired to be secured by Letters Patent is:

1. A shelf stable edible food coating composition comprising a fluid shortening containing from about 10 to 35% by weight of a solid triglyceride largely in the beta crystal form, a food grade binder to enhance the ability of the coating composition to adhere to a food item, and a breading material having a U.S. Standard sieve size of about 3-12, said binder and breading material being substantially distributed throughout said coating compositions.

2. The coating composition of claim 1 wherein the amount of fluid shortening is from 20 to 60% by weight of the composition, the amount of binder is from 7 to 30% by weight of the composition and the amount of breading material is from 10 to 35% by weight of the composition.

3. The coating composition of claim 2 wherein said fluid shortening contains from about 20 to 30% by weight of solid triglyceride largely in the beta crystal form.

4. The coating composition of claim 3 comprising from about 40 to 60% by weight of said fluid shortening, from about 7 to 21% by weight of said binder, and from about 10 to 20% by weight of said breading material.

5. The coating composition of claim 3 comprising from about 20 to 40% by weight of said fluid shortening, from about 7 to 30% by weight of said binder, and from about 18 to 35% by weight of said breading material.

6. The coating composition of claim 4 comprising from 45 to 55% by weight of said fluid shortening, from about 11 to 17% by weight of said binder, and from about 10 to 20% by weight of said breading material.

7. The coating composition of claim 5 comprising from 26 to 31% by weight of said fluid shortening, from about 8 to 28% by weight of said binder, and from about 18 to 35% of said breading material.

* * * * *